Jan. 25, 1944. J. B. ARMITAGE ET AL 2,340,210
MILLING MACHINE
Filed Aug. 31, 1939 4 Sheets-Sheet 1

INVENTORS
JOSEPH B. ARMITAGE
HOWARD W. BARTHOLOMEW
BY W. D. O'Connor
ATTORNEY

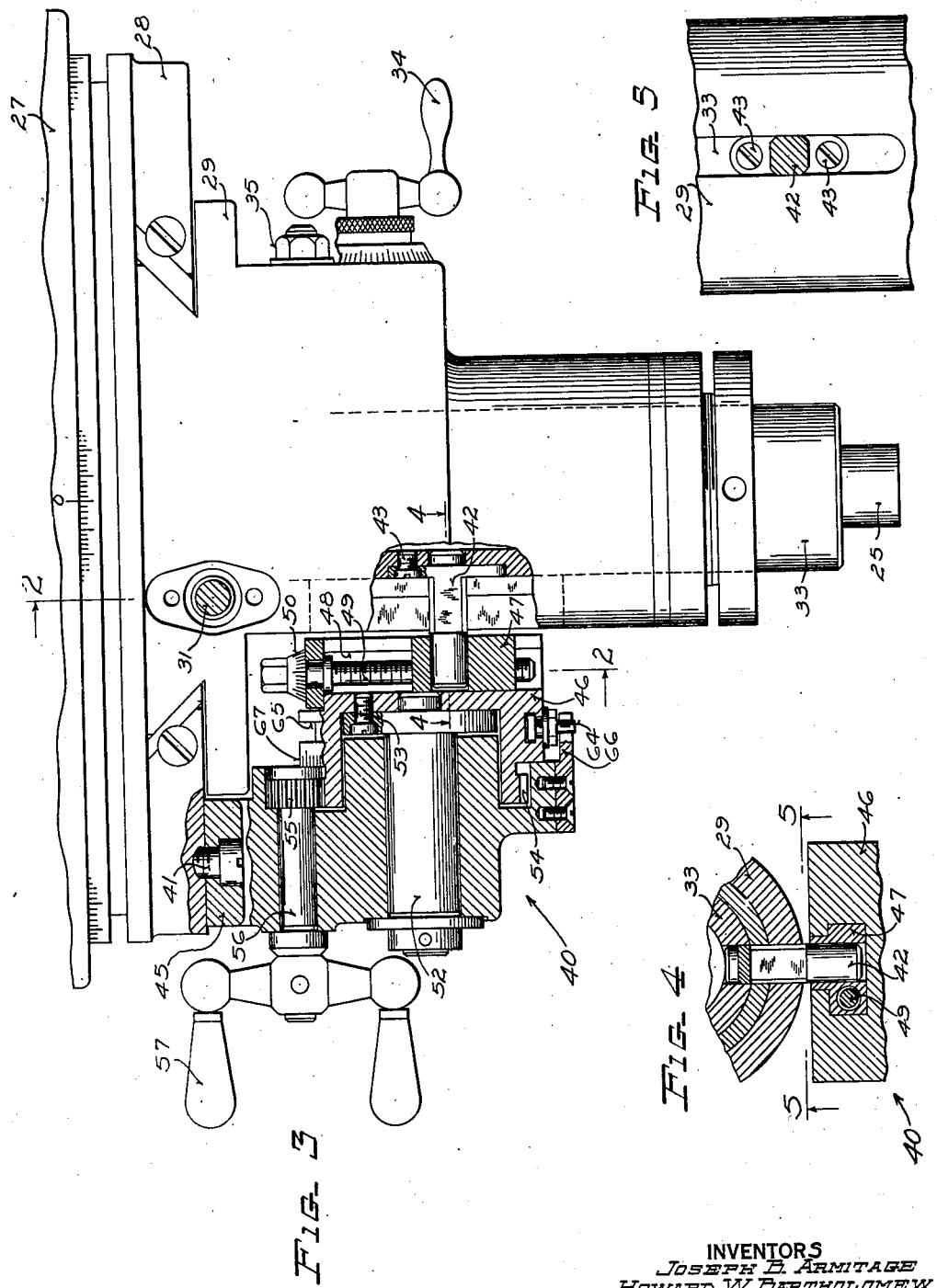

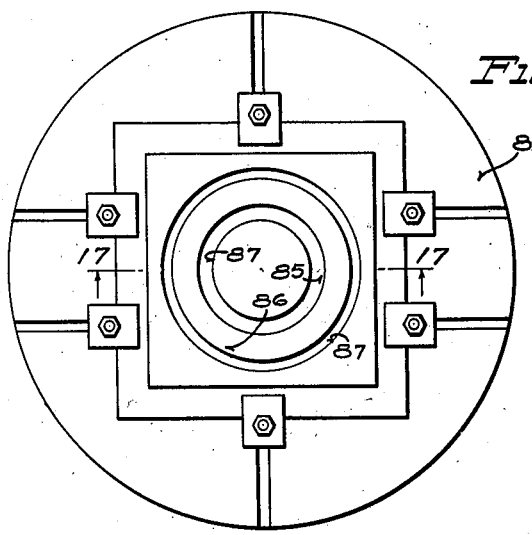

Patented Jan. 25, 1944

2,340,210

UNITED STATES PATENT OFFICE 2,340,210

MILLING MACHINE

Joseph B. Armitage, Wauwatosa, Wis., and Howard W. Bartholomew, Pottstown, Pa., assignors to Kearney & Trecker Corporation, West Allis, Wis., a corporation of Wisconsin Application August 31, 1939, Serial No. 292,758

27 Claims. (Cl. 90—15)

This invention relates generally to milling machines and more particularly to a milling machine of the type especially adapted to perform intricate machining operations such as are required in die sinking and similar work.

A general object of the invention is to provide an improved milling machine capable of performing milling operations of intricate character.

Another object of the invention is to provide an improved milling machine especially adapted to mill circular and spherical forms or like curvilinear configurations.

Another object is to provide improved apparatus for performing cherrying operations.

Another object is to provide a milling machine adapted to move a milling cutter along curvilinear paths in a plurality of angularly disposed planes.

Another object is to provide means for moving a milling machine spindle bodily in a circular path in a plane of its axis while gyrating it in a plane transverse to its axis.

Another object is to provide means for moving a milling machine spindle bodily in a plane of its axis along a rectilinear path at any predetermined angle to its axis.

According to this invention, a milling machine is provided with means for effecting bodily movement of its spindle in a curved path in a plane of its axis, in order that a cutter carried by the spindle may be caused to perform cherrying operations or similar curvilinear machining operations. Preferably, the cutter spindle is mounted in the machine in manner to permit axial movement and rectilinear movement transversely of its axis, an improved actuator or guiding means being provided for correlating the combined movements of the spindle in manner to effect a cutting movement along an arcuate path in an axial plane. For generating the desired arcuate movement, the actuator is rotated about an axis perpendicular to the plane of bodily movement of the spindle, a radially adjustable actuating block on the actuator functioning to transmit to the spindle circular movement along a path of predetermined diameter. By releasing the radially adjustable block to permit free movement thereof across the face of the actuator with the actuator guideway set at a predetermined angle, the spindle may be caused to follow a straight line path at any desired angle in the axial plane of movement for effecting rectilinear angular cutting operations. If the arcuate or angular movement of the spindle in its axial plane is combined with rectilinear movement of the workpiece in a transverse plane, elongated grooves or raised elements of arcuate or angular sections may be formed. By combining the arcuate or angular bodily movement of the spindle in an axial plane with gyratory bodily movement thereof in a plane transverse to its axis, configurations of compound curvilinear form, as conical or hemispherical elements, may be machined. Similarly, if the workpiece is rotated about an off-set axis in a plane transverse to the spindle, annular or toric configurations of internal or external arcuate or angular sections may be formed.

The invention is exemplified herein by means of a milling machine of special construction arranged to provide for gyratory bodily movement of its spindle and for axial and transverse radial bodily movement thereof, appropriate spindle guiding means being provided to effect the desired angular or circular movement of the spindle nose in its axial plane. However, it is to be understood that the particular milling machine shown and the arrangement for actuating and guiding the tool spindle are intended to be illustrative only, and that various other types of machine tools as well as differently constructed guiding mechanisms may be utilized in practicing the invention within the range of equivalents of the features defined in the subjoined claims.

The foregoing and other objects of this invention, which will become more fully apparent from the following detailed specification, may be achieved by the exemplifying structure depicted in and described in connection with the accompanying drawings, in which:

Fig. 3 is another enlarged view of the spindle supporting and guiding mechanism as seen from the right in Figs. 1 and 2, taken partly in vertical section along the plane represented by the line 3—3 in Fig. 1;

Fig. 4 is a fragmentary detail view of part of the spindle moving mechanism, taken in horizontal section on the plane represented by the line 4—4 in Fig. 3 and showing the quill actuating arm;

Fig. 5 is another fragmentary detail view of the quill and its actuating arm, taken in vertical section on the plane represented by the line 5—5 in Fig. 4;

Fig. 6 is a plan view of a workpiece showing an elementry groove formed therein in accordance with this invention;

Fig. 7 is a view of the same workpiece in vertical section, taken along the line 7—7 in Fig. 6;

Fig. 8 is a plan view of another workpiece showing an elongated groove and a raised element formed in accordance with the invention;

Fig. 9 is a view of the second workpiece in vertical transverse section, taken along the line 9—9 in Fig. 8;

Fig. 10 is a plan view of another workpiece presenting angular configurations formed by the improved milling machine embodying the invention;

Fig. 11 is a view in vertical section of the workpiece shown in Fig. 10, taken along the line 11—11;

Fig. 12 is a plan view of another workpiece upon which conical surfaces have been machined in accordance with the invention;

Fig. 13 is a view in vertical section of the workpiece shown in Fig. 12, taken along the line 13—13;

Fig. 14 is a plan view of another workpiece upon which surfaces of spherical shape have been formed;

Fig. 15 is a view in vertical section of the workpiece shown in Fig. 14, taken along the line 15—15;

Fig. 16 is a plan view of a rotary work supporting table carrying a workpiece upon which annular configurations have been machined in accordance with the invention; and Fig. 17 is a view in vertical section of the workpiece with annular configurations, taken along the line 17—17 in Fig. 16.

Figure 1:
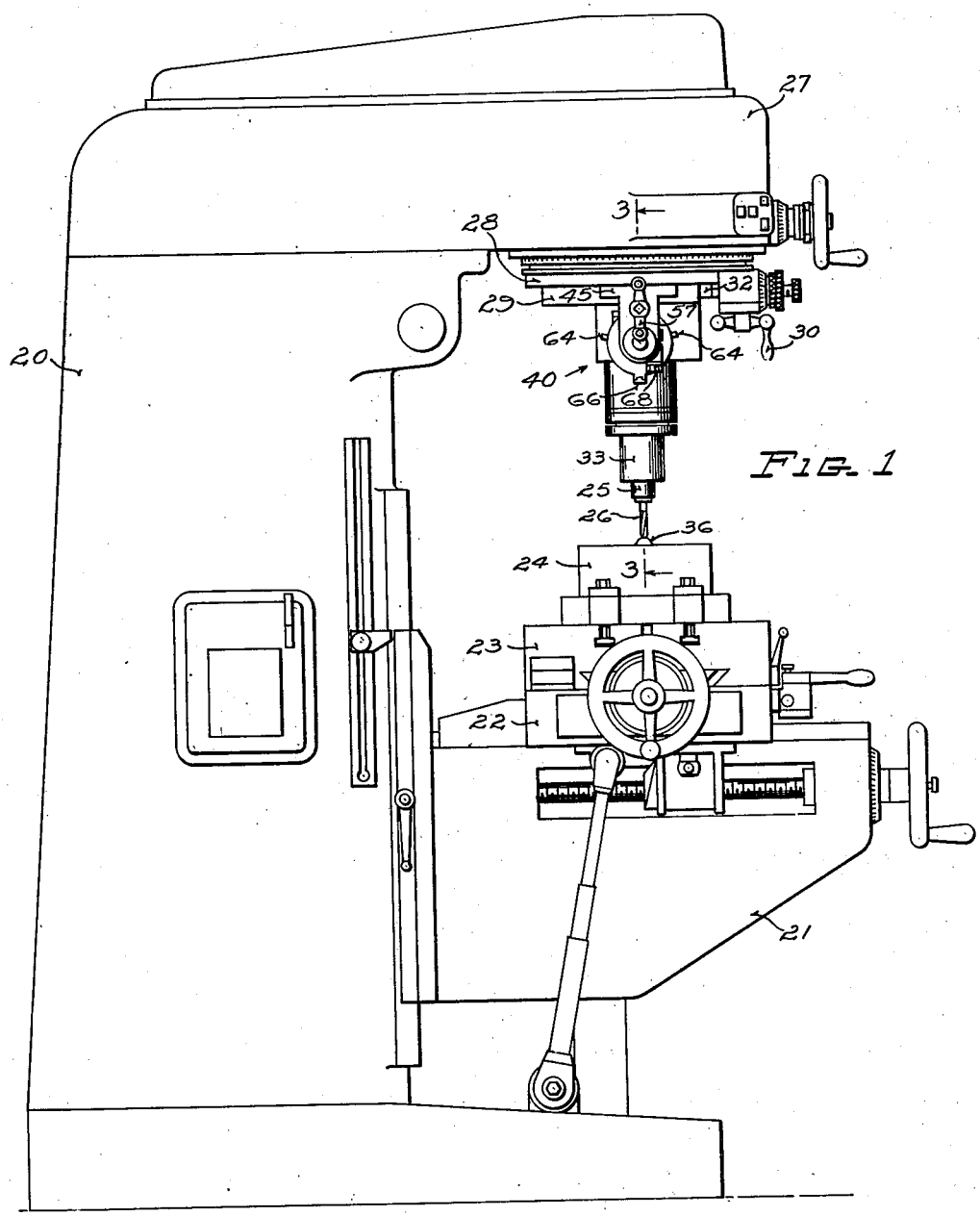
Figure 1 is a general view in left side elevation of a milling machine equipped with apparatus constituting a preferred embodiment of the novel features of the invention.

The machine tool shown in general in Fig. 1 of the drawings as exemplifying structure incorporating a preferred embodiment of the invention, is essentially a milling machine of the vertical spindle rotary head type invented by Howard W. Bartholomew and set forth and claimed in his Reissue Patent No. 20,893, the details of construction of the particular machine shown in the drawing being more fully set forth in the co-pending application of Joseph B. Armitage, filed July 14, 1939, Serial No. 284,387.

Referring more particularly to the drawings, the milling machine there shown comprises essentially a supporting frame or column structure 20 carrying cooperating work supporting and tool supporting members. The work supporting member includes the usual knee structure 21 arranged for vertical sliding movement along the front face of the column, a saddle 22 slidably mounted on the top of the knee for horizontal transverse movement, and a power driven work supporting table 23 slidably mounted on the saddle for horizantal longitudinal movement, the arrangement being such that a workpiece 24 mounted on the table 23 may be moved along any one of three mutually transverse paths in well known manner.

As fully set forth in the previously mentioned co-pending application, of Joseph B. Armitage, Serial No. 284,347, there is provided in cooperating relationship with the work supporting structure, a vertically disposed tool carrying spindle 25 adapted to receive a rotary milling cutter 26 for operating upon the workpiece 24 on the table 23. The cutter spindle 25 is carried by an overhanging superstructure 27 mounted on the top of the column 20, and is supported therein by a rotary spindle carrying head 28 arranged with its axis parallel with the axis of the spindle and that may be turned to revolve or gyrate the spindle bodily in a circular path in a horizontal plane transverse to its axis.

Figure 2:
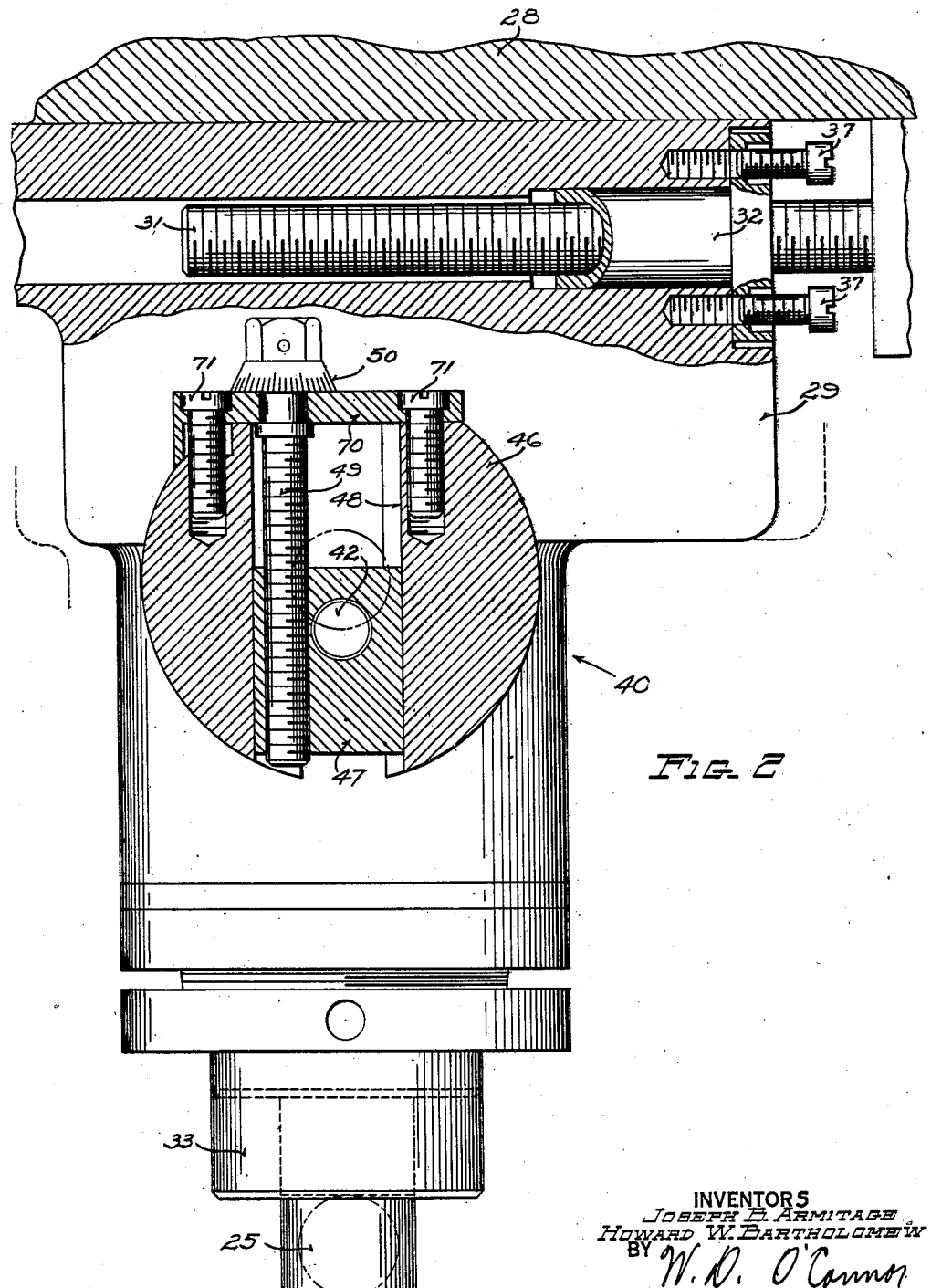
Fig. 2 is an enlarged view of the spindle supporting and guiding means shown in Fig. 1, taken partly in vertical section along the plane represented by the line 2—2 in Fig. 3.

To provide for adjusting the radial position of the spindle 25 relative to the center of rotation of the rotary head 28, the spindle is mounted in a radially adjustable transverse or cross slide 29 which may be moved along a diameter of the rotary head. Radial rectilinear adjustment of the slide 29 is effected by actuating a hand crank 30 that is operatively connected to turn an adjusting screw 31 journalled in the rotary head and threaded in a cooperating nut 32 secured to the cross slide 29, as shown in Figs. 2 and 3.

To provide for vertical or axial rectilinear movement of the cutter 26, the spindle 25 is rotatably supported in a vertically adjustable spindle carrying quill 33 slidably mounted in the cross slide 29. The spindle quill 33 may be adjusted vertically by actuating a hand crank 34 that projects from the side of the cross slide structure 29, as shown in Fig. 3. As more fully explained in the previously mentioned co-pending application, the hand crank 34 is operatively connected to the quill by actuating mechanism including a disconnecting clutch which may be engaged or disengaged by turning a nut 35 disposed on the side of the slide adjacent to the crank. Accordingly, by actuating the cranks 30 and 34, the cutter spindle 25 may be adjusted transversely and axially, as indicated by the dotted line position of the quill and the slide ends shown in Fig. 2, thereby providing for bodily movement of the spindle parallel with itself in a vertical plane extending through and including the axis of the spindle and the axis of the rotary head.

In accordance with the principles of the present invention, simultaneously axial and transverse bodily movement of the spindle 25 in its axial plane may be correlated or guided to effect curvilinear motion or to effect rectilinear motion along a path in any predetermined angular direction. For example the spindle 25 may be caused to move with a circular motion in its axial plane in manner to cause the milling tool 26 to move in an arcuate path in a vertical plane for performing cherrying operations or the like. By combining the arcuate motion in a vertical plane with rotary motion in a horizontal plane, effected by turning the rotary head 28, the cutter 26 may be caused to form a spherical configuration such as the hemisphere 36 embossed upon the surface of the workpiece 24 as indicated in Fig. 1.

To provide for effecting guided movement of the milling cutter 26 in its axial plane, the mechanism normally used for causing axial and transverse adjustment of the spindle is disconnected to free the spindle for vertical and horizontal movement in either direction. This is accomplished by loosening the nut 35 to disengage the clutch in the quill actuating mechanism, thereby releasing the quill for axial movement, and by removing a pair of screws 37 which retain the nut 32 in the cross slide 29, whereupon the nut may be withdrawn to the journalled end of the screw thereby permitting unrestrained cross movement of the slide.

With the spindle 25 thus freed for movement axially or transversely, the path of bodily movement of the spindle in its axial plane may be predetermined and controlled by means of a guiding mechanism 40 which is secured to the under surface of the rotary head 28 by means of screws 41 and is operatively connected to an arm 42 fixed on the quill 33 by screws 43. The arrangement of the guiding mechanism 40 is such as to cause movement of the arm 42 in a circular or arcuate path or alternatively, in a straight line path disposed at any predetermined angle in the axial plane, thereby causing the milling cutter 256 to follow a similar path since the spindle supporting mechanism is arranged to constrain the spindle to movement parallel with itself.

The guiding mechanism 40 comprises essentially a supporting bracket 45 which depends from the rotary head 28 at the side of the quill 33, the bracket being attached to the head by the screws 41 which pass through lugs formed integrally with it. As best shown in Fig. 3, the bracket 45 carries a rotatable actuating or controlling member 46 which is mounted thereon for rotation about an axis perpendicular to the axial plane of movement of the tool carrying spindle 25. The rotatable actuating member or actuator 46 carries in turn an eccentrically disposed slide block 47 which rotatably engages the end of the actuating arm 42 on the quill 33, the arrangement being such that when the actuator 46 is turned about its axis, the eccentric block 47 constitutes a connecting element causing the arm 42 to move in a circular path, thereby effecting coordinated axial and transverse movement of the quill 33 parallel with itself in the axial plane in manner causing the milling cutter 26 to move in a similar circular path.

To provide for establishing the diameter of the circular path of movement of the cutter 26, the eccentric block 47 is arranged for adjustment radially of the rotating member 46, being slidably fitted for this purpose in a transverse or diametral slot or slideway 48 in the rotatable member 46. For moving the block 47 radially, there is provided an adjusting screw 49 which is rotatably supported on the actuator 46 transversely thereof within the slot 48 and parallel with the slideway, as best shown in Fig. 2. The adjusting screw 49 has threaded engagement with a complementary nut formed in the block 47, as shown in Figs. 2 and 4, and it is provided with an indicating dial 50 that is graduated to indicate the radial position of the block 47 relative to the axis of rotation of the member 46.

As shown in Fig. 3, the rotatable actuating member 46 is carried on the inner end of a stub shaft 52 which is rotatably mounted in the supporting bracket 45, the actuating member being connected, by means of screws 53, to a flange formed integrally with the shaft. To provide for rotation of the actuating member 46 and its supporting shaft 52, the member 46 has formed on its periphery spur gear teeth 54 which are meshed by a pinion 55 on a shaft 56 that is journalled in the bracket 45 parallel with the shaft 52. As shown in Figs. 1 and 3, the shaft 56 is provided at its outer end with an actuating hand crank 57.

Upon turning the hand crank 57 the pinion 55 in engagement with the gear teeth 54 on the actuating member 46 causes it to rotate, thereby moving the quill 33 bodily with circular motion as previously explained. This circular motion of the quill 33 may be utilized, in its simplest form, to machine an arcuate groove or slot 59 of the type shown in Figs. 6 and 7, merely by rotating the crank 57 to feed the cutter 26 into the workpiece and out again along a semicircular path. In the event that the groove 59 to be formed is too deep to be machined conveniently by a single arcuate movement of the cutter, a succession of cuts of increasing depth may be taken, as indicated in Fig. 7 by the series of dotted lines 60. To this end the cutting operation may be started with an arcuate movement of small radius, and the cutting radius increased progressively between successive cuts by turning the adjusting screw 49, the dial 50 being observed to establish the depth of each cut and to predetermine the radius of the finished arcuate groove.

By feeding the work table 23 longitudinally in combination with the arcuate feeding movement effected by the guiding mechanism 40, the milling cutter 26 can be caused to machine in the workpiece an elongated groove 61 of the type shown in Figs. 8 and 9. Since the table 23 is power driven, it is preferable to effect the cutting stroke by power longitudinal movement of the table, the cutter being advanced progressively along its arcuate path to feed it into the work, by turning the hand crank 57 between successive cutting strokes.

As is apparent, the grooves 59 and 61 are formed by feeding the cutter 26 through the lower portion of its circular path of travel. By utilizing the upper portion of the circular movement as the feeding or cutting stroke, the guiding mechanism may be caused to move the milling cutter 26 in manner to form a relieved or raised external element 62 of arcuate section on the workpiece. As shown in Figs. 8 and 9, the raised element may likewise be made in elongated form by combining the arcuate feeding movement of the cutter with the longitudinal power feeding movement of the table.

In machining a raised configuration such as the element 62, it is desirable that the range of movement of the guiding mechanism be limited to the arc of the required contour, in order to avoid the possibility of accidentally feeding the cutter into the body of the workpiece below the predetermined finished surface line. For this purpose, the guiding mechanism is provided with limiting stops in the form of stop pins 64 that are adjustably positioned in a circular T slot 65 formed in the periphery of the rotatable member 46, as shown in Fig. 3, a fixed abutment 66 being provided on the lower side of the bracket 45 for engagement by the stop pins. As best shown in Fig. 1, two stop pins 64 are arranged, respectively, at opposite sides of the abutment 66 in manner to restrict the arcuate movement of the member 46 and consequently the corresponding movement of the cutter 26, within the limits of the angle between the two pins.

In the event that it is desired to move the milling cutter 26 along a rectilinear path disposed at a predetermined angle in its plane of movement, the rotatable actuating member 46 may be positioned to dispose the slideway 48 at the desired angle. For this purpose, the member 46 is provided with an angular scale 67 on its periphery that may be referred to for establishing the angle, whereupon the sliding block 47 may be moved along the slideway to cause the quill 33 and the milling cutter 26 to follow the desired angular line. For retaining the slideway in the predetermined angular position, the bracket 45 is provided with a clamping screw 68 so arranged that when it is tightened the stub shaft 52 is clamped within the bracket in manner to prevent rotation of the actuating member 46.

To accomplish this angular movement of the cutter, it is ordinarily preferable that the feeding action be effected by means of the spindle traversing screw 31 and its cooperating nut 32, rather than by turning the adjusting screw 49. To this end the sliding block 47 is released for free movement along the slideway 48 by entirely removing the block adjusting screw 49 and its supporting element. As shown in Fig. 2, the adjusting screw 49 is journalled in and secured against endwise movement relative to a supporting plate 70 which is secured to the rotatable member 46 by screws 71. By withdrawing the screws 71, the plate 70 may be disconnected from the rotating member 46, and the screw 49 may then be turned to withdraw it from the block 47. If now the spindle supporting slide 29 is moved transversely by actuating the hand crank 30 associated with the traversing screw 31, the sliding block 47 will follow along the slideway 48 at the predetermined angle shown on the scale 67, causing the quill 33 to move up or down as may be required in following the angular path of cutting movement.

By combining angular transverse movements of the cutter 26 with longitudinal feeding movement of the workpiece, elongated angular configurations such as the groove 73 and the raised element 74 shown in Figs. 10 and 11 may be formed. In the particular example shown, the angular configurations are disposed at the bottom of a depression 75 recessed into the workpiece, the various surfaces having been formed by a cutting tool of the type shown in Fig. 1, extended vertically into the depression and guided both vertically and horizontally, as previously explained. By rotating the rotary spindle carrying head 28 while feeding the cross slide 29 transversely, with the block 47 moving along an angularly disposed path, configurations of conical shape may be formed. As shown in Figs. 12 and 13 these figures may be formed to provide either a conical element 76 projecting from the workpiece in relief or a conical depression 77 recessed into the workpiece. By rotating the head through a complete revolution, a complete cone may be formed, or alternatively any angular fraction of a complete cone, such as the partial cones 76 and 77 shown in Figs. 12 and 13, may be cut by turning the rotary head back and forth through a fraction of a revolution between limiting positions.

Likewise, by combining the rotary movement of the spindle head 28 with arcuate movement of the milling cutter in an axial plane disposed radially of the head in the manner previously explained, a projecting element of spherical shape may be formed in relief on the workpiece or a similar depressed spherical configuration may be recessed into the workpiece. As shown in Figs. 14 and 15, a partial external hemispherical element 78 and a partial internal hemispherical element 79 may be formed by effecting fractional turning movements of the rotary head 28, while operating the cutter in the upper and lower halves, respectively, of its circular path of axial movement. By the same method, a quarter-spherical recess 80 may be cut into the workpiece by turning the head 28 back and forth through a half circle while feeding the cutter through a quarter circle in its axial plane. As another example, an external eighth-spherical surface 81 may be formed within a right angle corner 82 in the workpiece by turning the head back and forth through a quarter circle while feeding the cutter through a quarter circle constituting an upper quadrant of its circular path of travel in the axial plane. Since the rotary head 28 is provided with power driving mechanism, it is preferable to effect the cutting action or feeding stroke by power rotary movement of the head, the driving mechanism being disengaged automatically at the end of each arcuate cutting stroke by the rotary head trip mechanism, as described in the previously mentioned co-pending application.

The three mutually perpendicular faces constituting the corner 82 enveloping the eighth-spherical surface 81 may be formed by the same cutting tool that is used to form the spherical surface. This may be accomplished by effecting rectilinear relative cutting movement between the workpiece and the cutting tool, preferably by moving the work supporting structure along its mutually transverse paths. As in all milling operations, any of the various surfaces formed by the cutting tool 26 presents a series of minute wave-like ridges resulting from the successive cutting strokes and from the action of successive cutter teeth upon the workpiece. Consequently, the degree of perfection of the surfaces and the extent to which they approach geometrical accuracy depends largely upon the rate of relative feeding movement between the cutting tool and the workpiece. Hence by reducing the rate of feeding movement, any of the surfaces formed in accordance with this invention may be caused to approach its geometrically perfect shape as nearly as may be required.

If, now, the workpiece is mounted on a rotary table 84, as shown in Fig. 16, with the axis of the table parallel to and off-set laterally relative to the axis of the spindle head 28 and with the axial plane of movement of the spindle disposed radially of the table, the various configurations of arcuate or angular section may be cut in circular form by rotating the table in coordinated relationship with guided movement of the cutter spindle in its axial plane. For instance, the cutter spindle may be moved through an arcuate path in a lower quadrant of its circle of movement while the rotary table is being rotated, to form an annular depression or groove 85 of internal quarter-round or cavetto shape in the body of the workpiece. By moving the spindle in an upper quadrant of its circular path, an annular or toric raised element 86 of external quarter-round or ovolo shape may be formed. Vertically disposed circular walls 87 may be formed in the workpiece by feeding the cutting tool vertically while the table is rotating, and the horizontal plane elements may be formed by feeding the cutting tool horizontally in well known manner. Similarly, by moving the cutter 26 along predetermined angular paths as previously explained, while rotating the table, internal and external annular elements of angular section may be generated.

From the foregoing description of preferred apparatus for effecting machining operations by moving a milling cutter in an arcuate or angular path in an axial plane, it is apparent that there has been provided by this invention an improved and highly efficient milling machine particularly adapted for forming configurations of compound curvilinear shape and capable of performing intricate and precise machining operations.

Although the single mechanism shown in the drawings has been described in detail for the purpose of fully setting forth practical apparatus embodying the invention, it is to be understood that the structure herein described is intended to be illustrative only, and that the various novel features of the invention may be incorporated in other structural forms without departing from the spirit and scope of the invention as defined in the subjoined claims.

The principles of the invention having now been fully explained in connection with the foregoing description of the illustrative embodying apparatus, the invention is hereby claimed as follows:

1. A milling machine comprising a frame, a work supporting table slidably mounted on said frame for movement in a horizontal plane, a tool supporting head rotatably mounted in said frame above said table, a transverse slide carried by said head for movement radially thereof, a spindle carrying quill slidably mounted in said slide for vertical axial movement toward or from said table, a tool carrying spindle rotatably mounted in said quill, means operatively connected to turn said head for imparting gyratory movement to said spindle, and means for correlating the radial and axial movements of said spindle in manner to impart to a tool carried thereby arcuate movement in a vertical plane.

2. In a machine tool having a frame, a spindle carrying head rotatably mounted in said frame, a cross slide mounted for radial movement in said head, a quill slidably mounted for axial movement in said cross slide, a tool spindle rotatably mounted in said quill, means operatively connected to drive said tool spindle in any position assumed by said quill, means to rotate said head in manner to impart gyratory movement to said tool spindle, and means to correlate the radial and axial movements of said cross slide and said quill in manner to impart movement to a tool in said spindle along an arcuate path in a plane disposed radially of said rotary head.

3. In a milling machine for forming spherical surfaces, a frame, a work supporting member carried by said frame, a milling cutter supporting spindle disposed to cooperate with said work supporting member, a spindle carrying quill arranged to rotatably support said spindle, a rotatable spindle head journalled in said frame and carrying said spindle quill in manner to gyrate it in a circular path in a plane transverse to the spindle axis, and means for moving said quill in an arcuate path in a plane disposed radially of said head and axially of said spindle, whereby a configuration of hemispherical shape may be formed by a milling cutter in said spindle upon a workpiece on said work supporting member.

4. In a milling machine for forming toric surfaces, a supporting frame, a rotatable work supporting member carried by said frame, a rotatable cutter supporting spindle disposed to cooperate with said work supporting member, a spindle carrying element arranged to support said spindle for movement bodily in an axial plane extending through the axis of said work supporting member, means to guide said spindle carrying element in manner to effect bodily movement of said spindle in an arcuate path in said axial plane, and means for effecting coordinated rotary movement of said rotatable work suporting member about an axis parallel with but spaced from the axis of said spindle, whereby a milling cutter supported by said spindle may be caused to machine a toric configuration upon a workpiece on said work supporting member.

5. A machine tool for machining a spherical surface on a workpiece, that comprises a rotating milling cutter for engagement with the workpiece, means for revolving the cutter bodily in a plane transverse to its axis of rotation, and means for moving the cutter bodily in an arcuate path in a plane of its axis of rotation.

6. In a milling machine, the combination with a rotatable tool carrying spindle mounted for bodily movement in a plane including its axis and in a plane transverse to its axis, of means to move said spindle in a circular path in each of said planes.

7. A machine tool comprising a work supporting structure, a tool supporting head mounted for rotary movement relative to said work supporting structure, a tool spindle mounted in said rotary head, means to provide for axial and radial bodily movement of said spindle relative to said head, and means to guide said bodily movement along a curvilinear path in a radial plane of said head.

8. A machine tool comprising a work supporting structure, a tool supporting head mounted for rotary movement relative to said work supporting structure, a tool spindle mounted in said rotary head with its axis of rotation parallel with the axis of rotation of said head, means to provide for axial and radial bodily movement of said spindle relative to said head in a radial plane thereof, and means to guide the bodily movement of said spindle along a circular path in said radial plane, whereby a cutting tool carried by said spindle may be caused to move in a circular path in a radial plane of said head and also in a circular path in the plane of rotation of said head.

9. A milling machine comprising a frame, a work support, a tool carrying head rotatably mounted in said frame, a tool spindle carried by said rotatable head said spindle being disposed with its axis parallel with the axis of rotation of said head and being mounted for rectilinear bodily movement axially of said rotatable head and for rectilinear bodily movement radially of said rotatable head, and guiding means carried by said rotatable head including a rotatable member operatively connected to said spindle and functioning to correlate the rectilinear movements thereof in manner to effect bodily movement of said spindle in a circular path in a radial plane of said rotatable head, whereby a milling cutter carried by and driven by said spindle may be given feeding movements along arcuate paths in perpendicularly related planes to effect a spherical milling operation upon a workpiece stationarily mounted upon said work support.

10. A milling machine comprising a frame, a work support, a tool carrying head rotatably mounted in said frame, a tool spindle carried by said rotatable head said spindle being mounted for rectilinear bodily movement axially of said rotatable head and for rectilinear bodily movement radially of said rotatable head, and guiding means carried by said rotatable head including a rotatable member operatively connected to said spindle and functioning to correlate the rectilinear movements thereof in manner to effect bodily movement of said spindle in a circular path, whereby a milling cutter carried and driven by said spindle may be given feeding movements along arcuate paths in angularly related planes to effect a spherical milling operation upon a workpiece stationarily mounted upon said work support.

11. In a milling machine having a rotatable tool carrying spindle mounted for bodily gyratory movement in a plane transverse to its axis of rotation and for radial and axial movement in a plane including its axis of rotation, the combination with means for effecting said gyratory movement, of means for guiding said radial and axial movement in a circular path, whereby a workpiece may be machined by a milling cutter carried in said spindle to form a surface in the shape of an element of a sphere.

12. In a machine tool, a work supporting structure, a tool spindle disposed in cooperating relationship with said work supporting structure, means supporting said spindle in manner to provide for bodily movement thereof in a circular path in a plane transverse to its axis of rotation, end means arranged to provide for bodily movement of said spindle in a circular path in a plane including its axis of rotation.

13. In a machine tool, a work supporting structure, a tool spindle disposed in cooperating relationship with said work supporting structure, means supporting said spindle in manner to provide for bodily movement thereof in a curvilinear path in a plane transverse to its axis of rotation, and means arranged to provide for bodily movement of said spindle in a curvilinear path in a plane including its axis of rotation.

14. In a milling machine adapted to form conical surfaces, a frame, a work supporting member carried by said frame, a milling cutter supporting spindle disposed to cooperate with said work supporting member, a spindle carrying quill arranged to rotatably support said spindle, a rotatable spindle head journaled in said frame and carrying said spindle quill in manner to gyrate it in a circular path in a plane transverse to the spindle axis, and means for moving said quill relative to said head along an angularly disposed path in an axial plane of said spindle, whereby a configuration of conical shape may be formed by a milling cutter in said spindle upon a workpiece stationarily held on said work supporting member.

15. In a milling machine for forming curvilinear surfaces, a frame, a work supporting member carried by said frame, a milling cutter supporting spindle disposed to cooperate with said work supporting member, a spindle carrying quill arranged to rotatably support said spindle, a rotatable spindle head journalled in said frame and carrying said spindle quill in manner to gyrate it in a circular path in a plane transverse to the spindle axis, and means for moving said quill along a predetermined non-radial and non-axial path in a plane disposed radially of said head and axially of said spindle, whereby a configuration of predetermined curvilinear shape may be formed by a milling cutter in said spindle upon a workpiece on said work supporting member.

16. In a milling machine having a frame, a work support carried by said frame, a rotary tool spindle disposed to cooperate with said work support, means supporting said tool spindle on said frame in manner to permit bodily gyratory movement thereof and bodily movement in an axial plane, means to gyrate said spindle bodily, and means to guide said spindle in manner to cause it to move in a circular path in said axial plane, whereby a milling cutter carried by said tool spindle may be adjusted along an arcuate path in the plane of its axis of rotation while it is gyrating.

17. In a machine tool having a work support and a cooperating tool supporting spindle, means rotatably carrying said spindle in manner to permit bodily gyratory movement thereof and bodily adjustment in an axial plane, means to gyrate said spindle bodily, and means to guide said bodily adjustment in said axial plane along a predetermined non-radial path, whereby a workpiece on said work support may be machined to an annular shape of predetermined contour.

18. In a milling machine, the combination with a rotatable tool carrying spindle mounted for bodily movement in a plane including its axis and in a plane transverse to its axis, of means to move said spindle in a circular path in one of said planes and along an angularly disposed path in the other of said planes.

19. A machine tool comprising a work supporting structure, a tool supporting head mounted for rotary movement relative to said work supporting structure, a tool spindle mounted in said rotary head, means to provide for axial and radial bodily movement of said spindle relative to said head, and means to effect combined axial and radial bodily movement along a predetermined path in a radial plane of said head.

20. In a milling machine, the combination with a rotatable tool carrying spindle mounted for bodily movement in two angularly disposed planes, of means operative to move said spindle in a circular path in each of said planes.

21. A machine tool comprising a work support, a rotary tool supporting spindle mounted for gyratory movement in cooperating relationship with said work support, and guiding means arranged to effect coordinated simultaneous radial and axial adjustment of said spindle along a predetermined line while it is rotating and gyrating.

22. In a milling machine having a rotatable tool carrying spindle mounted for bodily gyratory movement in a plane transverse to its axis of rotation and for radial and axial adjustment in a plane including its axis of rotation, the combination with means for effecting said gyratory movement, of means for guiding simultaneous radial and axial adjustment along a predetermined path, whereby a workpiece may be machined by a milling cutter carried in said spindle to form an annular surface of predetermined shape.

23. In a machine tool, a rotary cutter carrying spindle, a work support mounted for movement in a plane transverse to said spindle, means supporting said spindle for gyratory radial and axial bodily movements, and guiding means to coordinate simultaneous radial and axial bodily movements while said spindle is gyrating bodily and rotating, to thereby effect a predetermined cutting action upon a workpiece carried by said moving work support.

24. In a machine tool, a work supporting structure, a rotary cutter supporting spindle mounted in cooperating relationship with said work supporting structure, means arranged to gyrate said spindle, and guiding means to effect coordinated simultaneous radial and axial bodily movement of said spindle while it is gyrating.

25. A milling machine comprising a frame, a work supporting table mounted on said frame, a tool supporting head rotatably mounted in said frame in cooperating relationship with said table, a transverse slide carried by said head for movement radially thereof, a spindle carrying quill slidably mounted in said slide for axial movement toward or from said table, a tool carrying spindle rotatably mounted in said quill, means operatively connected to turn said head for imparting gyratory movement to said spindle, and means for correlating the radial and axial movements of said spindle in manner to impart to a tool carried thereby movement in an axial plane along a predetermined line.

26. In a milling machine, a spindle carrying quill mounted for axial sliding movement, a tool spindle rotatably mounted in said spindle quill, a quill actuating member mounted for rotary movement in a plane parallel with the axis of said quill, means operatively connecting said rotary actuating member to said quill in manner to effect axial movement of said quill in response to rotation of said actuating member, and adjustable stop means arranged to limit the extent of rotary movement of said actuating member whereby to regulate the extent of axial movement of said quill.

27. In a milling machine, a spindle carrying quill mounted for axial movement and for transverse movement in an axial plane, a tool spindle rotatably mounted in said spindle quill, a quill actuating member mounted for rotary movement in a plane parallel with said axial plane of movement, a connecting element arranged to move radially of said quill actuating member and operatively connected to said spindle quill, releasable means arranged to retain said connecting element in predetermined radial position on said quill actuating member to provide for moving said quill in a circular path when said quill actuating member is rotated, and means to retain said quill actuating member in any predetermined angular position to provide for linear movement of said quill along a path at a corresponding angle under guidance of said connecting element when it is released for movement radially of said actuating member.

JOSEPH B. ARMITAGE.
HOWARD W. BARTHOLOMEW.